(No Model.)
D. L. HOLDEN.
ICE MAKING MACHINERY.
No. 490,475. Patented Jan. 24, 1893.
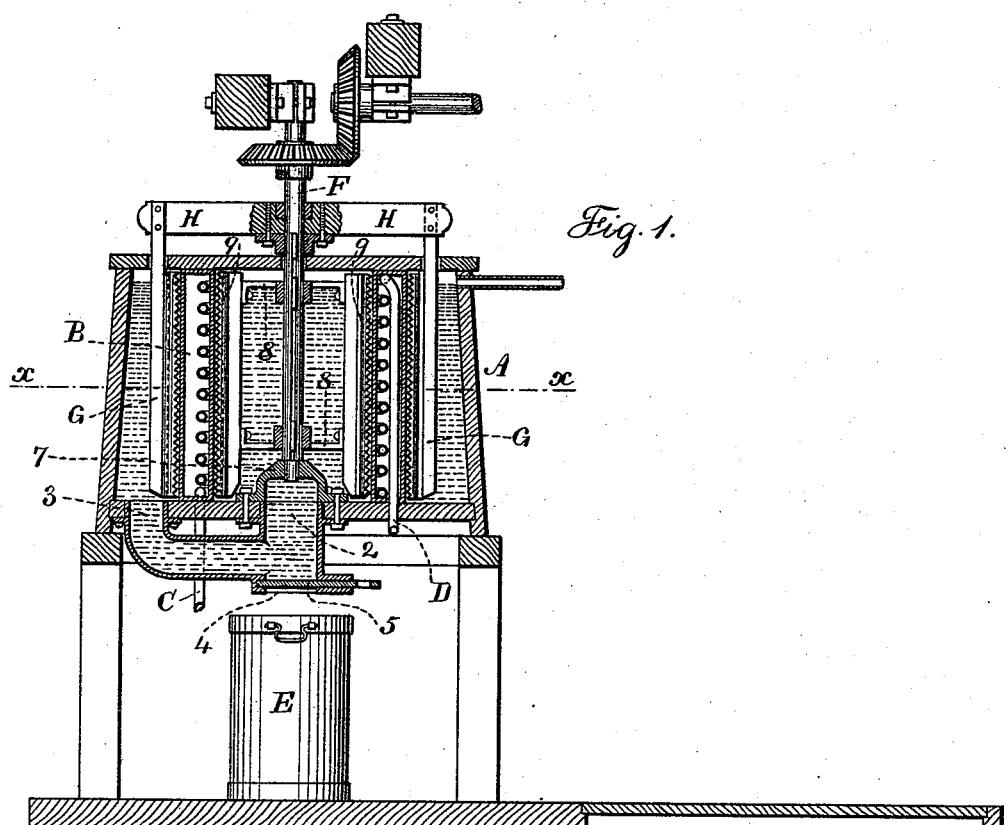
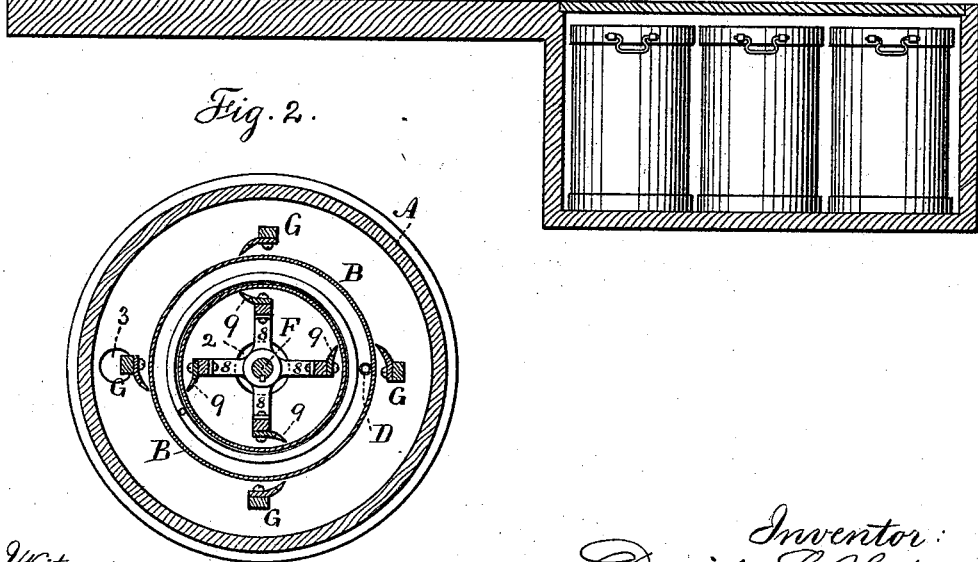
Witnesses:
J. Staib
Chas. H. Smith
Inventor:
Daniel L. Holden
per Lemuel W. Serrell
Att'y

UNITED STATES PATENT OFFICE.

DANIEL L. HOLDEN, OF NEW YORK, N. Y.

ICE-MAKING MACHINERY.

SPECIFICATION forming part of Letters Patent No. 490,475, dated January 24, 1893.

Application filed April 18, 1892. Serial No. 429,513. (No model.)

*To all whom it may concern:*

Be it known that I, DANIEL L. HOLDEN, a citizen of the United States, residing in the city and State of New York, have invented an Improvement in Ice-Making Machinery, of which the following is a specification.

In refrigerating apparatus it has been customary to provide water holding vessels and to expose the same to external or internal refrigerating pipes or vessels. As the ice is formed either upon the interior of the water holding vessel or upon the exterior of the cooling pipes or chambers the intervening layer of ice, between the water and the refrigerating device, lessens the cooling energy exerted upon the water, and the thicker the layer of ice becomes the less efficient is the cold, and the same is true when a layer of ice forms upon the surface of the water. The consequence of this is that a greater period of time is consumed in consolidating the block of ice in the center portions than upon the exterior. My invention is made to obviate this difficulty, and by my present improvements the mass of water is closely filled with crystals of ice, so that the external cold applied to the water holding vessel causes the same to consolidate uniformly and rapidly to the center of the block of ice.

In the drawings Figure 1 is a vertical section representing my improved mechanism for filling water with ice crystals, and Fig. 2 is a sectional plan at the line *x x*.

I provide a water holding vat A of suitable size and introduce into the same an annular refrigerating chamber B which is usually of metal, and the refrigerating devices of the same may be of any suitable character. Liquid ammonia may be admitted directly into such refrigerating chamber, or there may be a coil of pipe within such chamber into which the ammonia is admitted to act upon brine or the brine may be passed through similar material within the annular refrigerating chamber and surrounding the coil of pipe. I have represented the ammonia pipe at C and the pipe D as passing to the absorber as usual in refrigerating apparatus. This annular refrigerating chamber B is suitably supported within the vat A, preferably by resting upon the bottom thereof, and there is a central opening 2 and a second opening 3, both leading to a common delivery pipe 4, and there is a valve 5 of any suitable character adapted to open or close the openings 2 or 3 either simultaneously or separately to allow the contents of the vat A to discharge by gravity into a suitable ice holding box E.

The vat A is to be partially filled with water and a layer of ice will be formed upon the exterior surfaces of the annular refrigerating chamber B, and I provide for scraping or cutting off this annular layer as rapidly as the same is formed, so that the ice crystals or chips so cut off remain in the water in the vat A, and the operation is continued until the water becomes a semi-frozen mass that is sufficiently fluid to be discharged when the valve 5 is opened, thereby avoiding the congealing of the water into a solid mass within the vat A, the object being to pass out this mass before congealation takes place and to receive the same into the ice holding box E below the opening 4, so that such ice holding box E can be transferred to a refrigerating chamber where it is exposed to the action of cold that is sufficiently intense to rapidly congeal the whole mass.

Any suitable mechanism may be made use of for cutting or scraping off the layer of ice as it is formed upon the surface of the refrigerating chamber B.

I prefer and have represented the refrigerating chamber B as cylindrical, so that the ice may be scraped or cut off by a rotary movement.

The central shaft F is mounted in a step 7 and it is suitably supported at the upper end and driven by competent power, and there are arms 8 and scrapers 9 connected with the shaft F within the annular refrigerating chamber, and the pendent arms G from the cross head H are provided on their inner edges with cutters or scrapers for cutting off the ice from the exterior surface of the annular refrigerating chamber, hence as the shaft F and parts therewith connected are revolved with more or less rapidity, the ice as it forms in a layer upon the annular refrigerating chamber is progressively removed and remains in the form of chips or needles in the water within the vat A, and the scrapers and pendent arms act to stir the water within the vat A and cause the crystals of ice to be distributed throughout the contents of the vat and the water therein cooled as a whole until the ice crystals accumulate to the desired extent and are on the point of congealing, at which time the water and ice crystals are drawn off as aforesaid into an ice holding box below the delivery pipe 4. By this means great rapidity and uniformity of action are insured and the ice is free or nearly so from bubbles of air or gas, and the final congealing operation takes but a small space of time.

I claim as my invention.

1. In an ice making apparatus, the combination with the vat, of an annular refrigerating chamber, pipes for supplying to such chamber the refrigerating material, a central shaft and scrapers connected therewith within the annular refrigerating chamber, and a discharge pipe and valve, substantially as set forth.

2. In an ice making apparatus, the combination with the vat, of an annular refrigerating chamber, pipes for supplying to such chamber the refrigerating material, a central shaft and scrapers connected therewith within the annular refrigerating chamber, a discharge pipe and valve, and scrapers outside the annular refrigerating chamber and connections from the same to the revolving central shaft, substantially as set forth.

Signed by me this 24th day of November, 1891.

DANIEL L. HOLDEN.

Witnesses:
GEO. T. PINCKNEY,
WILLIAM G. MOTT.